United States Patent [19]
Biggs et al.
[11] Patent Number: 4,540,997
[45] Date of Patent: Sep. 10, 1985

[54] METHOD AND APPARATUS FOR AVOIDING THE DRYING OF INK IN THE INK JETS OF INK JET PRINTERS

[75] Inventors: Lawrence G. Biggs, Beaverton; Pierre Radochonski, Lake Oswego, both of Oreg.

[73] Assignee: Tektronix, Inc., Beaverton, Oreg.

[21] Appl. No.: 593,326

[22] Filed: Mar. 26, 1984

[51] Int. Cl.[3] .............................................. G01D 15/18
[52] U.S. Cl. .................................. 346/140 R; 346/1.1
[58] Field of Search ........................ 346/140 R, 1.1, 75

[56] References Cited

U.S. PATENT DOCUMENTS 3,925,788 12/1975 Kashio .................................. 346/75
3,925,789 12/1975 Kashio .................................. 346/75
4,176,363 11/1979 Kasahara ............................. 346/140
4,364,065 12/1982 Yamamori ........................... 346/140

*Primary Examiner*—Joseph W. Hartary
*Attorney, Agent, or Firm*—Allston L. Jones; Robert S. Hulse

[57] ABSTRACT

This invention includes a method and apparatus for causing ink to be ejected from the ink nozzles for a second selected time period if the printer has not functioned for a first selected time period independent of whether power is or is not applied to the printer during those periods. The first time period is selected to minimize the possibility of ink clogging the ink nozzles and the second time period is selected to dislodge any thickened ink which may have developed in the ink nozzle during the first time period. The first time period for most ink compositions and nozzle sizes will be considerably longer than the second time period.

5 Claims, 3 Drawing Figures

METHOD AND APPARATUS FOR AVOIDING THE DRYING OF INK IN THE INK JETS OF INK JET PRINTERS

BACKGROUND OF THE INVENTION

The present invention relates to preventing the clogging of ink jet nozzles in ink jet printers, particularly when those printers have been off for an extended period of time.

Ink jet printers, which are currently in use, are fast, relatively noiseless and provide a resolution of approximately 1000 adjacent dots per line. In order to provide the necessarily fine ink particles, the ink jet nozzles must be correspondingly small. The small diameter of the nozzle, together with the small volume of ink in the nozzle awaiting ejection creates a problem wherein the ink within the nozzle may at least begin to solidify when exposed to room atmospheric conditions. If the time between ink ejections exceeds 15–30 minutes, depending on the type of ink and the inner diameter of the nozzle, the ink may begin to solidify and thus prevent the ejection of the proper amount of ink when the print command is received by the ink jet nozzle subsystem. If this occurs, the line printed will at least be incomplete. If the ink nozzles become clogged, they are not easily cleared and an expensive service call may result because of the small size of those nozzles.

Several techniques have been used in prior art ink jet printers to clear an ink clog in a nozzle or to minimize the possibility of the clogging of the ink nozzles. The Silonics Model 30790-02 ink jet printer, during normal printing, utilizes the microprocessor to monitor the number of drops each ink channel ejects. If a channel has not been used within a 100 second period, the microprocessor commands the channels to eject a drop of ink.

U.S. Pat. No. 3,925,789 discloses an ink jet printer wherein, during normal printing, a timer is employed to count the elapsed time between ink ejections from each of the ink nozzles. Then, if the elapsed time between ejections for any one nozzle exceeds a preselected time, e.g. 15 to 30 minutes, the control unit is triggered which in turn activates the ink pump to cause ink to be ejected from the unused nozzle into an ink collector for 10–12 seconds. In addition, this patent discloses the ejection of ink from each nozzle for several seconds upon the application of power to the printer. This is intended to dislodge a clog from the ink nozzles which may have developed while the printer was turned off. If the printer was off for an extended period this method may not be able to dislodge a well hardened clog.

A technique used in other ink jet printers to minimize the possibility of the development of clogs is the washing of the nozzles after each copy is completed. After each copy is completed the ink nozzles are transported to a home position where a wash station, including a water tight rubber seal, is brought into communication with each nozzle. Water from a wash tank is then sprayed on the external portions of the nozzles to remove any ink residue which may have collected on the external portion of the nozzle in the vicinity of the open end of the nozzle. This water is then returned to the tank. During the power off period the nozzles remain sealed with the wash station where the humidity is slightly higher than in the ambient room environment. However, even under the elevated humidity conditions the ink remaining within the ink jet nozzles will harden and clog them after a few days.

None of the above discussed prior art approaches for the preventing of clogs within the nozzles of ink jet printers provide a positive method for preventing clogs when the printer is not powered for extended periods of time. The present invention provides a method for preventing the clogging of the ink nozzles when the printer is not in use for an extended period without having to drain and flush the ink subsystem, including the nozzles.

SUMMARY OF THE INVENTION

In accordance with the preferred embodiments of the present invention there is provided an ink jet printer and method of operation to minimize the possibility of the clogging of the ink nozzles. This is done by transporting the ink nozzles to communicate with a wash station upon the generation of an end of copy signal by a control unit, which is disposed to receive power from an uninterrupted power supply, in response to input data signals. The nozzles remain in communication with the wash station until additional data for creating a new copy is received by the control unit.

Also disposed to receive power from an uninterrupted power supply is a timer unit for counting the time since the occurrence of the end of copy signal or the last ejection of ink from the nozzles. When the counted time equals a first selected time period a signal is generated which triggers the ink driving means to eject ink from the nozzles into the wash stations for a second selected time period. The ink driving means is also disposed to receive power from the uninterrupted power supply. After the expiration of the second selected time period the ink driving means and the timer unit are each reset to stop the ink ejection and to restart the measurement of another first selected time period.

DESCRIPTION OF THE PREFERRED EMBODIMENT

Figure 1:
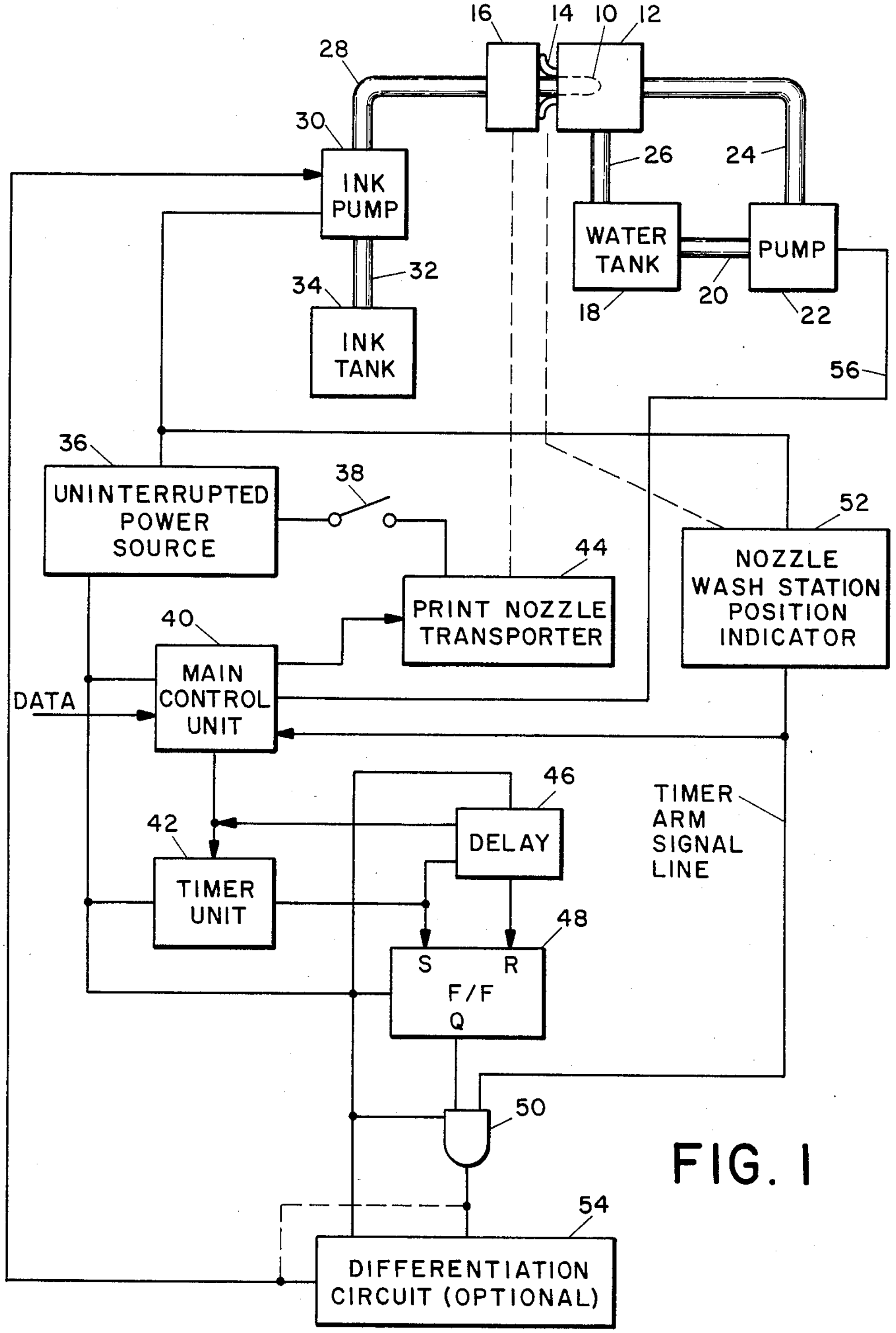
FIG. 1 shows a block diagram of the ink jet printer nozzle cleaning subsystem of the present invention.

FIG. 1 shows an ink nozzle 10 in its home position extending into a wash station 12. In a typical ink jet printer equipped with wash stations, the nozzles 10 are returned to a position as shown after each page is printed to rinse the nozzle with water from a typical water tank 18. The water is pumped from tank 18 by a typical pump 22 via hoses 20 and 24 as shown. The water is then returned to tank 18 by gravity via hose 26. To retain the water within the wash station 12, a flexible seal 14 is provided thereon to seal with the shoulder 16 of nozzle 10 when it is in position.

Since it is the object of the present invention to drive a measured volume of ink through nozzle 10 if there has been no printing during a preselected time interval whether or not the printer is turned on, at least a portion of the control circuitry of the printer must be powered by an uninterrupted power source 36.

In a typical ink jet printer the input data for printing is applied to a main control unit 40, e.g. a microprocessor and associated memory, where it is processed to coordinate the transport of the nozzles 10 across the face of the recording media (not shown) with the ejection of the ink to print the desired image. Control unit 40 also develops an end of copy signal which is applied to a typical print nozzle transporter 44 to return the nozzles 10 to their wash station 12, as discussed above, at which time control unit 40 applies an appropriate signal to pump 22 via line 56 in response to a signal from nozzle-wash station position indicator 52. Indicator 52 can be any of many well known proximity detectors, e.g. a spring loaded switch which is activated when the nozzle 10 is seated with with wash station 12. Main control unit 40 and indicator 52 are shown receiving power from the uninterrupted source 36 and transporter 44 receives its power via printer on-off switch 38. The end of copy signal is derived in any of several conventional ways depending on the particular control unit design being utilized. For example, it may be generated through the detection of a particular signal pattern at the end of the user applied data, it may be initiated manually by the user through the document length selected via a control panel, or by any other well known means.

Timer unit 42, which may be a conventional timing unit, is also coupled to the uninterrupted power source 36 to permit timing when the main power switch 38 is open. Timer unit 42 receives a reset pulse which is the end of copy signal from the main control unit 40. When the selected time set in timer unit 42 elapses, timer unit 42 generates an output signal which conventionally sets flop-flop 48 and produces an output signal therefrom.

The output signal from flip-flop 48 is applied to an AND gate 50 together with the timer arm signal from position indicator 52. The output signal from AND gate 50 is then applied to ink pump 30 via differentiation circuit 54 in pulse printing systems and directly in continuous ink flow printing systems. Timer unit 42 and flip-flop 48 are each reset by output signals from delay circuit 46, which may be a conventional delay circuit. The input signal to delay circuit 46 is the output signal from timer unit 42.

In such a system, the time between ejections of ink from nozzle 10 into wash station 12 under the control of ink pump 30 is the selected time out time of timer unit 42, and the ejection period corresponds to the selected time delay of delay circuit 46. The selection of these times for optimum performance depends on several factors which include the ambient humidity level within the wash station, the chemical composition of the ink and the inner diameter of the ink nozzles. As a result of actual tests and calculations it has been found that ink ejections of approximately 10 seconds in duration 48 hours apart will prevent ink clogs within nozzles within a wash station.

Figure 2:
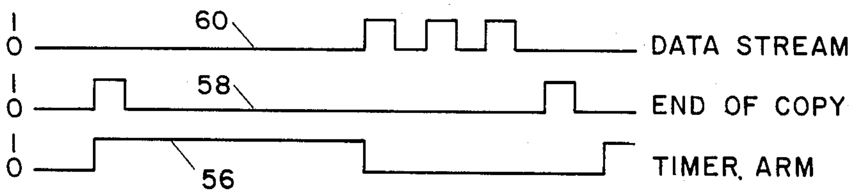
FIG. 2 shows the time relationship between several signals of the present invention.
Figure 3:
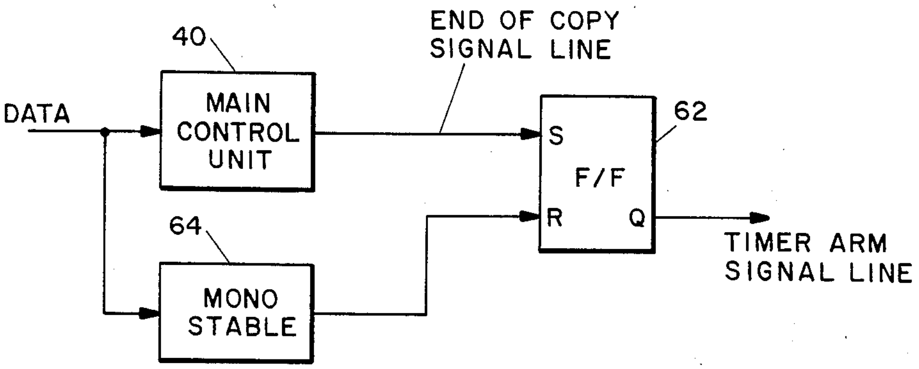
FIG. 3 is a partial block diagram of the subsystem of the present invention showing an alternate implementation for the timer arm signal.

Referring next to FIGS. 2 and 3 there is shown an alternate approach to forming the timer arm signal. In an ink jet printer without a position indicator 52 to indicate when the nozzle 10 is positioned within wash station 12, control unit 40 will delay the initiation of the wash cycle from the generation of the end of copy signal to allow transporter 44 sufficient time to transport the nozzles to the wash stations. In this alternative structure (FIG. 3) the end of copy signal (58) is applied to the set terminal of a second flip-flop 62 to switch the timer arm signal from the Q output terminal to the logic one state (ON) (56). When a data signal (60) is applied to control unit 40 to initiate printing, it is also applied to a monostable multivibrator 64, which may be of a conventional design, to generate a reset signal which is applied to the reset terminal of flip-flop 62 to switch the timer arm signal to the logic zero level (OFF) (56). The balance of the circuit operates as discussed in relation to FIG. 1.

For a printer system having multiple ink nozzles 10 wherein individual timing to prevent clogging is desirable, the circuit would be substantially duplicated for each ink nozzle. Otherwise, drivers may be added to drive the ink pumps 30 or water pumps 22 simultaneously.

The circuits disclosed above are intended to be illustrative of an implementation which may be utilized to achieve the desired result. However, these implementations are not intended to be limiting on the protection for the invention sought hereby. The scope of this invention is only intended to be limited by the maximum scope of the following claims.

What is claimed is:

1. Ink jet recording apparatus comprising:

ink ejection means for selectively dispensing ink;

transporting means for positioning the ink ejection means during a stand-by mode in response to an end of copy signal;

wash station means for coupling with said ink ejection means during the stand-by mode;

control unit means disposed to be coupled to receive power from an uninterrupted power source for generating an end of copy signal in response to input data signals;

timer unit means disposed to be coupled to receive power from an uninterrupted power source for determining a first time period since the occurrence of the end of copy signal and the last ejection of ink from the ink ejection means, and for generating an output signal when said first time period exceeds a first selected time period;

ink ejection driving means disposed to be coupled to receive power from an uninterrupted power source for driving the ink ejection means to eject ink into the wash station means for a second selected time period in response to the output signal from the timer unit means, and for generating a signal to reset the timer unit means following the expiration of the second selected time period.

2. Ink jet recording apparatus as in claim 1 further including arm signal generation means for generating a signal indicative of the ink ejection means being coupled with the wash station means, said signal being applied to the ink ejection timing means to limit the ejection of ink during the second time period to when the ink ejection and wash station means are properly coupled.

3. Ink jet recording apparatus as in claim 1 wherein the first selected time period is longer than the second selected time period.

4. A method for preventing the clogging of the ink nozzles of an ink jet recorder between generation of copies, the method comprises the steps of:

a. generating an end of copy signal in response to input data signals;

b. positioning the ink nozzles coupled with a wash station in response to the end of copy signal;

c. resetting a timer unit to determine a first time period since the occurrence of the end of copy signal independent of the printer being provided with uninterrupted power;

d. driving ink from the ink nozzles for a second selected time period when the first time period exceeds a first selected time period independent of the printer being provided with uninterrupted power;

e. resetting the timing unit following the expiration of the second selected time period to determine the time period since the occurrence of the second selected time period independent of the printer being provided with uninterrupted power; and f. repeating steps (d) and (e) until additional data for the printing is applied to the printer.

5. A method as in claim 4 wherein the first selected time period is greater than the second selected time period.

* * * * *